United States Patent
Broker et al.

[11] Patent Number: 6,167,327
[45] Date of Patent: Dec. 26, 2000

[54] PRICING CONTROL SYSTEM FOR MULTI-OPERATION VENDING MACHINES

[75] Inventors: John F. Broker; Douglas A. Ochsner, both of Newton, Iowa

[73] Assignee: Maytag Corporation, Newton, Iowa

[21] Appl. No.: 08/998,764

[22] Filed: Dec. 29, 1997

[51] Int. Cl.[7] .................................................. G06C 15/04
[52] U.S. Cl. ........................................... 700/238; 705/20
[58] Field of Search .................... 700/238, 231, 700/232; 705/20, 409

[56] References Cited

U.S. PATENT DOCUMENTS

| | | | |
|---|---|---|---|
| 4,598,378 | 7/1986 | Giacomo | 700/236 |
| 4,636,963 | 1/1987 | Nakajima et al. | 700/238 |
| 4,674,618 | 6/1987 | Eglise et al. | 194/210 |
| 4,679,150 | 7/1987 | Hayashi et al. | 700/238 |
| 4,999,763 | 3/1991 | Ousborne | 700/11 |
| 5,172,314 | 12/1992 | Poland et al. | 705/1 |
| 5,225,977 | 7/1993 | Hooper et al. | 705/41 |
| 5,299,113 | 3/1994 | England et al. | 700/17 |
| 5,339,250 | 8/1994 | Durbin | 700/237 |
| 5,345,379 | 9/1994 | Brous et al. | 700/17 |
| 5,386,362 | 1/1995 | Keret | 705/30 |
| 5,424,940 | 6/1995 | Ousborne | 700/1 |
| 5,694,323 | 12/1997 | Koropitzer et al. | 705/400 |

*Primary Examiner*—Paul P. Gordon
*Assistant Examiner*—Paul Rodriguez
*Attorney, Agent, or Firm*—Everett G. Diederiks, Jr

[57] ABSTRACT

A pricing control system for multi-operation vending machines, such as those commonly found in laundromat facilities, incorporates an offset price setting field for storing at least one incremental offset price which is added to a pre-established base price in order to set the cost for a respective vending machine operation. In accordance with a first preferred embodiment of the invention, a single offset price is used to increment each of the base prices established for a given vending machine such that the costs associated with each of the operations is incremented an equal amount. In accordance with another embodiment of the invention, multiple offset price amounts are stored and added to pre-determined base prices to establish the cost of each of the respective vending machine operations. The price control system is considered to be particularly advantageous when utilized in connection with a debit card charging arrangement and enables facility operators to change the numerous vending machine operation prices by only altering the data stored in the offset price setting field. In addition, the use of the pricing control system of the present invention readily enables penny increment price changes to be implemented in existing vending machine facilities.

18 Claims, 1 Drawing Sheet

PRICING CONTROL SYSTEM FOR MULTI-OPERATION VENDING MACHINES

BACKGROUND OF THE INVENTION

1. Field of the Invention

The present invention pertains to the art of vending machines and, more particularly, to a pricing control system for vending machines, each of which is adapted to provide multiple customer operations at varying prices.

2. Discussion of the Prior Art

In the art of vending machines, such as washers and dryers commonly found in a laundromat facility, operation prices have been generally set in increments of a single monetary coin, such as a quarter. Therefore, if the operator of such a facility desired to make a price increase, a minimum increase of a quarter would be necessary. Of course, this would generally represent a rather hefty increase, at least percentage wise, which may not be readily accepted by facility patrons. For this reason, the implementation of even justified price increases are typically delayed or avoided.

The introduction of debit cards for use in such facilities has greatly enhanced the ability to implement a wider range of pricing schemes. This, taken in conjunction with the fact that the machines of such facilities are now typically linked to a central processor which is used to establish the various operation prices and to monitor/collect operational data, the operators of such facilities now have the capability of establishing smaller price changes for the various machine operations.

Unfortunately, such systems still have associated limitations. For instance, the available price increments are generally a factor of a nickel or more. Although this incremental figure can be considered much more desirable than a quarter, the ability to provide even penny increments would be appealing. Of course, implementing changes to a vending system must be justified economically. Penny increments have not been attractive to establish due, at least in part, to the storage space necessary for such an arrangement. With pricing systems, it is known to utilize a ROM or RAM to store pricing data which can be accessed based on a set pricing scheme. Therefore, individual vending machine operation prices would be placed in certain storage fields. Obviously, the addition of dimes and/or nickels to a typical quarter-based pricing system would increase the amount of memory needed to provide a wide range of available operational prices. The use of penny increments would substantially increase the necessary storage space in the memory.

Although it would be possible to just provide an extremely large database of available pricing schemes, it would be much more desirable, particularly from a cost standpoint, to have the ability to vary the pricing beyond current limits without having to substantially increase the amount of available memory of a pricing module. Of course, a few factors present formidable obstacles to implementing such a system. For instance, in the case of a laundromat facility, washing machines can be generally operated in various modes and at each of hot, warm and cold temperature settings. Various operating modes would also be available for dryers of the facility. Therefore, any such pricing system would have to accommodate pricing changes for many modes of operation. In addition, due to the data stream that exists between the vending machines and the central processor in such facilities, only a couple of bytes of memory are generally available for any such pricing system change without substantially altering the basic system memory or reducing the ability of the system to monitor/collect operational data.

Based on the above, there exists a need to implement a pricing control system for multi-operation vending machines which provides for pricing changes in penny increments, can account for pricing changes in each of the multi-operation modes of the machines and requires an absolute minimum amount of storage area for the pricing data.

SUMMARY OF THE INVENTION

It is an object of the present invention to provide a pricing system for vending machines wherein the system can establish price changes in penny increments.

It is another object of the invention to provide such a pricing system that can be used to establish price changes in each of a plurality of operational modes of the vending machines in a simple, efficient manner.

It is still another object of the invention to provide a pricing control system for multi-operation vending machines which requires a minimum amount of storage area so as to not detract from desired data monitoring and/or collecting functions of the overall control system.

These and other objects of the invention are achieved by establishing an offset price setting field in a price setting device of the control system and storing a desired offset price that preferably equals a penny increment amount in this field. The desired offset price would then be added to a respective base price, which is stored in a base price setting field, to establish a respective vending machine operation price. With this arrangement, currently established base price fields could remain intact, yet the prices of various vending machine operations could still be increased by the penny increment amount.

To minimize necessary system alterations and overall implementation costs, a single byte of storage space is preferably utilized for the offset price setting field. In accordance with one embodiment of the invention, a single penny increment amount is stored in the offset price setting field and this offset amount is added to each of the stored base prices to establish the vending machine operation prices for each of the available customer operations. For example, when applied to washers and dryers of a laundromat facility, each washing machine may have nine different price settings and each dryer may have two price settings depending upon the selected cycle and temperature settings. In any event, the base prices established for each of these operations could be incremented by the single price placed in the offset price setting field. Therefore, not only can the offset price enable penny increment changes to be established, but only the desired offset price needs to be set in order to increase each of the operation prices. Obviously, this represents a simple and efficient price setting system.

It has been found that a single byte of memory can actually be used to store more than one offset field for use in the pricing control system of the invention. Therefore, in accordance with a second embodiment of the invention, the offset price setting field is divided into at least two field zones, with each zone storing a different offset price amount. With this arrangement, the offset price amount in one of the field zones is added to preselected ones of the base prices to establish vending machine operation prices for certain ones of the operation modes and the offset price amount in the other of the field zone is used in establishing the prices for other vending machine operation modes.

Regardless of which embodiment is implemented, a minimum amount of storage space is needed to enable price changes for each of the vending machine operations and overall price changes can be made by simply inputting into the system the desired offset price(s). In addition, the offset price field can advantageously establish penny increment changes for the vending machine operations which provides operators of vending machine facilities greater latitude in making justified pricing changes.

Additional objects, features and advantages of the invention will become more readily apparent from the following detailed description of preferred embodiments thereof when considered in conjunction with the system illustrated in the accompanying drawing.

DETAILED DESCRIPTION OF THE PREFERRED EMBODIMENTS

Figure 1:
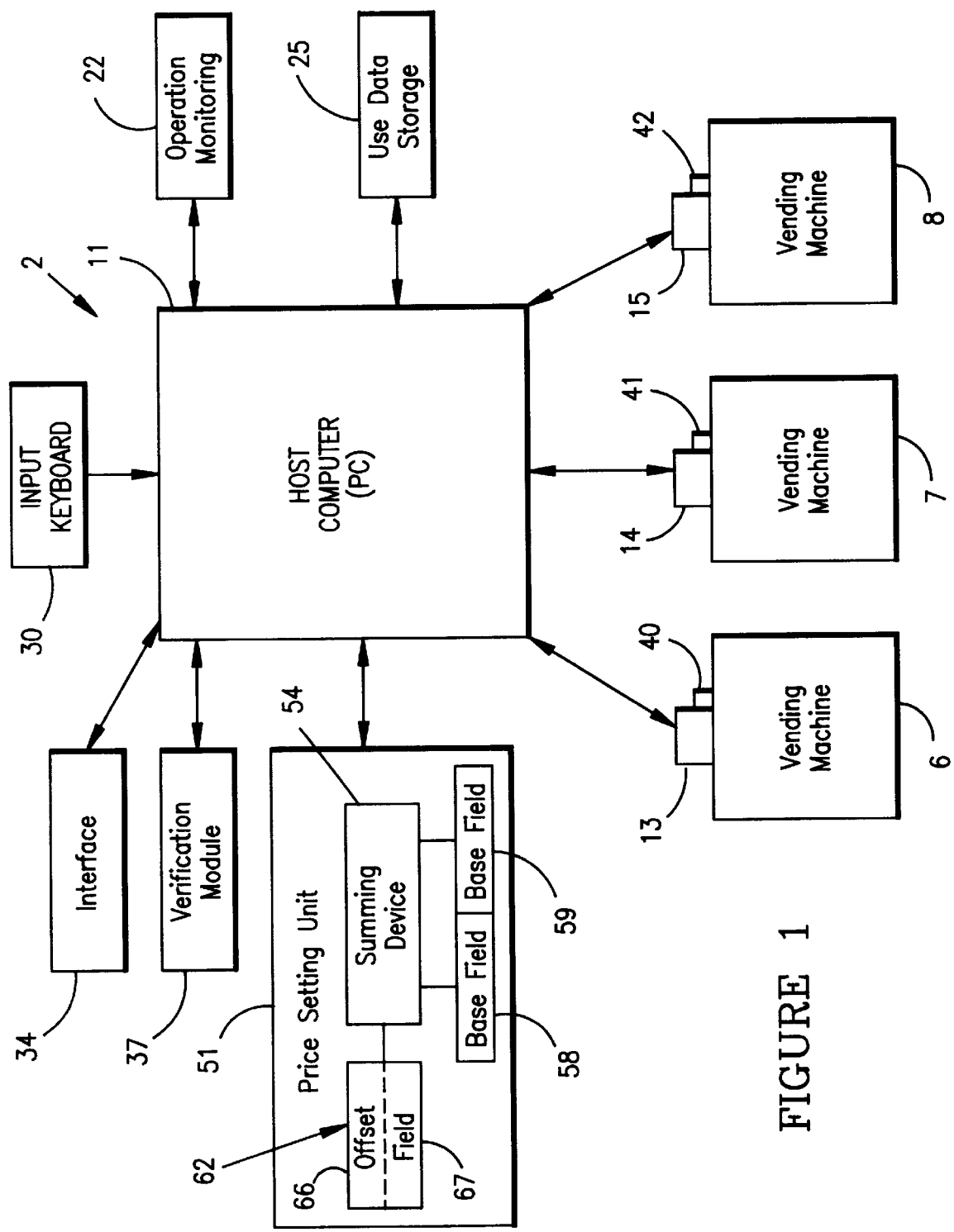
FIG. 1 is a schematic of a control system for multi-operation vending machines incorporating the pricing arrangement of the present invention.

With reference to the accompanying drawing, a control system 2 of the present invention is adapted to monitor and control the operation prices of multiple vending machines, with three such machines being indicated at 6–8. Initially, it should be noted that vending machines 6–8 can take various forms in accordance with the present invention. For instance, when control system 2 is applied to a laundromat, vending machines 6–8 can constitute washing machines, dryers and/or dispensing machines for edible products or items used in connection with the washers and/or dryers. In addition, it should be realized that the particular number of vending machines 6–8 that are associated with control system 2 should not be considered limiting in accordance with the present invention, but rather three such vending machines 6–8 are simply shown in FIG. 1 for exemplary purposes.

Control system 2 includes a host computer 11 which, in the preferred embodiment, is simply constituted by a personal computer. Host computer 11 is interconnected to local controllers 13–15 which are directly associated with vending machines 6–8 respectively. More specifically, each local controller 13–15 actually controls the operation of an associated vending machine 6–8 and communicates with host computer 11 for various reasons, such as for operation monitoring, transferring machine use information, access verification, price setting and similar control parameters for vending machines 6–8 in a manner which is known in the art.

As illustrated, host computer 11 incorporates a unit 22 that functions to monitor the operation of each of the vending machines 6–8. In general, operation monitoring unit 22 assures that each of the vending machines 6–8 are properly performing predetermined, sequential operating steps established for their particular use. Host computer 11 also has associated therewith a storage unit 25 which receives data associated with the use of each vending machine 6–8. The information in data storage unit 25 can be used for various purposes, such as establishing maintenance periods for vending machines 6–8.

Host computer 11 also has associated therewith an input keyboard 30 which can be utilized by an operator of the facilities to access operation monitoring unit 22 and use data storage unit 25, as well as to control other system parameters as will be discussed more fully below. Preferably, host computer 11 incorporates an interface 34 which enables a portable computer or other controller to communicate with host computer 11. For instance, interface 34 can be utilized by facility maintenance personnel or simply owners of the facility to directly access the control system 2. For the sake of completeness, it should also be noted that it is known in the art to actually interface with such a control system directly through local controllers 13–15 by means of a wireless data transfer link or through a modem. An access verification module 37 is also provided to control the potential flow of information from host computer 11 through interface 34 or directly through local controllers 13–15.

The pricing control system of the present invention is particularly advantageous to implement when debit cards are to be utilized in operating vending machines 6–8. For this reason, FIG. 11 illustrates debit card reading devices 40–42 which are associated with local controllers 13–15 respectively. In a manner known in the art, a debit card can be inserted into any one of reading devices 40–42 to pay for the use of the selected vending machine 6–8. Each vending machine 6–8 may provide multiple customer operations at varying prices which are controlled by a price setting unit 51. In general, it is known in the art to store different base prices for the various customer operations associated with each of the vending machines 6–8. Depending upon the particular customer operations selected at local controllers 13–15 by the customer, a predetermined price will be deducted from the debit card inserted into a corresponding reading device 40–42.

As indicated above, it is known to establish and store a predetermined base price in a particular field for each of the customer operations. Of course, in such an arrangement, it is necessary to increase and re-store each of the base prices whenever the various customer operations are increased in price. Obviously, this can represent a rather cumbersome and time consuming process or the need for a specific computer program to perform this function. In accordance with the present invention, price setting unit 51 includes a summing device 54 that is used to add to a base price stored in a respective base field 58, 59, a desired offset price that is stored within an offset price setting field 62. Therefore, in accordance with the present invention, a desired offset price can be stored in offset field 62, either by inputting the price directly through keyboard 30, through an auxiliary controller linked to host computer 11 through interface 34 or directly through local controllers 13–15. In this manner, the price for a particular customer operation will be set by adding the price stored in the offset field 62 to the base price stored in a respective one of base fields 58 and 59. In this manner, only a single offset price needs to be inputted into control system 2 in order to vary the pricing for all of the customer operations.

In accordance with the preferred embodiment of the invention, each of the base fields 58 and 59 have base prices stored therein which are selected multiples of a nickel-base amount. For example, vending machine 6 may constitute a washing machine having different prices established for various modes of operation. For instance, the washing machine may have a certain price for a warm cycle and a higher price for a hot temperature cycle. In accordance with the present invention, the pre-established prices for these cycles would be stored in respective base fields 58 and 59 as selected multiples of nickel-based amounts. Therefore, if $1.00 is set for the warm cycle and $1.25 for the hot cycle, base price field 58 would be set at twenty (20) and base price field 59 at twenty-five (25). However, it may be desired to increment these prices. Of course, if these incremental prices represent multiples of a nickel, base price fields 58 and 59 could be directly adjusted. However, if not, such as if penny increment amounts are desired, base price fields 58 and 59 cannot be appropriately altered. Instead, in accordance with the present invention, the penny increment amount would be entered into offset field 62. Thereafter, when the customer inserts a debit card within reading device 40 and selects a warm cycle at local controller 13, price setting unit 51 would establish a price for that particular customer operation that is equal to the sum of the base price established by the nickel-based multiple stored in base price field 58 and the amount stored in offset field 62. Similarly, if the hot cycle was selected, the price amount in base field 59 would be added to the amount in offset field 62.

To this point FIG. 1 and the above description relate to a networked, overall control system for multi-operation vending machines. However, it should be realized that each of the machines 6–8 can operate independently without departing from the spirit of the invention. Therefore, each local controller 13–15 can be provided with a dedicated price setting unit 51 that operates in the manner described above, with the desired price increments being directly entered into base and offset fields 58, 59 and 62 at the individual machines 6–8. In addition, other control functions, such as operation monitoring, use data, and verification information, can be provided at the local controllers 13–15.

Although vending machine 6 as described in the above example as only having two customer operations, it should be readily apparent that the present invention can be utilized to increment prices for any number of customer operations performed by the vending machines 6–8. For a washing machine alone, there may be the need for even nine different operation prices, such as regular pricing for hot, warm and cold washing cycles, special prices which may be established during off-peak or holiday time periods in each of these temperature ranges and super cycle prices, which may provide an extra rinse or impart supplemental mechanical washing action upon the clothes or the like, for each of the temperature settings. In any event, each of these different prices can be set in individual base fields or certain base fields may overlap. For instance, the regular price for a cold cycle may be equal to that of a hot cycle during off-peak periods. Therefore a single base price field can be utilized. In any event, summing device 54 would add the price amount set in these particular base fields with the amount set in offset field 62 to make the incremental pricing changes.

Obviously, the data stream between host computer 11 and local controllers 13–15 can be quite large and require substantial storage. In attempting to implement the present invention on existing vending machine control systems, it has been found that very little storage space is actually available without compromising the collection/monitoring of data and the various other controls being performed. However, it has been advantageously found that the present invention can be incorporated in control system 2 by only utilizing a single byte of storage space for offset field 62. Therefore, in accordance with the first embodiment of the invention described above, a single desired offset price is stored in offset field 62 and offset price setting field 62 is constituted by a single byte of storage space.

It has also been found that even the single byte of space can be utilized to store multiple offset prices. This provides even greater versatility to the pricing control system 2 of the present invention. Therefore, in accordance with a second embodiment of the invention, offset field 62 is divided into an upper four bit zone 66 and a lower four bit zone 67, with upper and lower zones 66 and 67 having stored therein respective first and second desired offset prices. With this arrangement, incremental price changes can be made within summing device 54 by adding the price in a respective base field 58, 69 to the price set in a predetermined zone 66, 67 of offset field 62. This arrangement enables incremental changes for the various customer operation prices to vary between the different modes of operation of vending machines 6–8. For example, if vending machine 7 constitutes a dryer having two available drying temperature settings, the offset price amount stored in upper zone 66 can be utilized to increment a base price stored for one of the drying temperatures and the offset price stored in lower zone 67 can be utilized to increment the base price for the other dryer temperature setting. In the case of a washing machine, the various offset price amounts could be utilized in a similar manner. FIG. 1 has illustrated offset field 62 divided into upper zone 66 and lower zone 67 by a dotted line (not separately labeled) and this has been found to be an easy way to divide up a single byte storage field. Therefore, if offset field 62 is used to store multiple offset prices, different incremental price amounts could be utilized for the regular, special and/or super cycle pricing schemes in the case of a washing machine price setting system.

Although only a single byte of storage space is preferred for offset field 62 in accordance with the present invention in order to ease the implementation of the pricing control system of the present invention, it would be possible to provide more storage space for control system 2. For example, if two additional bytes were provided, this would allow full penny increment pricing changes for substantially all available pricing schemes on a typical laundromat washer with only a total of three additional bytes of storage space beyond the storage space required for the various base price setting fields. In any event, the use of the offset fields 62 in accordance with the present invention enables incremental pricing increases in a simple, time efficient and cost effective manner. In addition, utilizing the penny increment amounts, facility operators will have the ability to readily vary pricing beyond current limits with only having to change the price (s) established in offset field 62.

Although described with respect to preferred embodiments of the present invention, it should be readily understood that various changes and/or modifications can be made to the present invention without departing from the spirit thereof. Instead, the invention is only intended to be limited by the scope of the following claims.

We claim:

1. In a system for controlling a vending machine adapted to provide at least first and second customer operations at varying prices, a price setting device comprising:

a base price setting field for storing first and second predetermined base prices for the first and second customer operations respectively;

an offset price setting field for storing a desired offset price, wherein the desired offset price equals a penny increment amount ranging from zero to four cents, and control unit for establishing vending machine operation prices for the first and second customer operations, with at least one of the vending machine operation prices being determined by adding the desired offset price to one of said first and second predetermined base prices.

2. The price setting device according to claim 1, wherein each of the first and second predetermined base prices is preset as a selected multiple of a nickel-based amount.

3. The price setting device according to claim 1, wherein only said desired offset price is stored in said offset price setting field, with the desired offset price being added to each of the first and second predetermined base prices by the control unit to establish the vending machine operation prices.

4. The price setting device according to claim 3, wherein said offset price setting field is constituted by a single byte of storage space.

5. The price setting device according to claim 1, wherein said offset price setting field stores first and second desired offset prices, with the first desired offset price being added to the first predetermined base price by said control unit to establish a first vending machine operation price for the first customer operation and the second desired offset price being added to the second predetermined base price to establish a second vending machine operation price for the second customer operation.

6. The price setting device according to claim 5, wherein only the first and second desired offset prices are stored in the offset price setting field.

7. The price setting device according to claim 6, wherein said offset price setting field is constituted by a single byte of storage space.

8. The price setting device according to claim 7, wherein said first desired offset price is stored in a first four bit zone of the single byte and said second desired offset price is stored in a second four bit zone of the single byte.

9. In a system for controlling a vending machine adapted to provide at least first and second customer operations at varying prices, a price setting device comprising:

at least one base price setting field for storing first and second predetermined base prices for the first and second customer operations respectively;

an offset price setting field for storing a desired offset price, wherein the desired offset price equals a penny increment amount ranging from zero to four cents; and control means for establishing vending machine operation prices for at least one of the first and second customer operations by adding the desired offset price to at least one of said first and second predetermined base prices.

10. The price setting device according to claim 9, wherein only said desired offset price is stored in said offset price setting field, with the desired offset price being added to each of the first and second predetermined base prices by said control means to establish the vending machine operation prices.

11. The price setting device according to claim 9, wherein said offset price setting field stores first and second desired offset prices, with the first desired offset price being added to the first predetermined base price by said control means to establish a first vending machine operation price for the first customer operation and the second desired offset price being added to the second predetermined base price to establish a second vending machine operation price for the second customer operation.

12. The price setting device according to claim 11, wherein said offset price setting field is constituted by a single byte of storage space.

13. The price setting device according to claim 12, wherein said first desired offset price is stored in a first four bit zone of the single byte and said second desired offset price is stored in a second four bit zone of the single byte.

14. A method of establishing operation prices for vending machines, each of which is adapted to provide at least first and second customer operations at varying prices, comprising:

establishing individual base prices for each of the first and second customer operations;

storing a desired, incremental penny offset price, ranging from zero to four cents, in an offset price setting field; and adding the desired offset price to a predetermined one of the individual base prices to arrive at a vending machine operation price for the first customer operation.

15. The method according to claim 14, further comprising: adding the desired offset price to each of the base prices for a uniform increase in vending machine operation prices for each of the first and second customer operations.

16. The method according to claim 15, further comprising: storing the desired offset price in a single byte of storage space.

17. The method according to claim 14, further comprising:

storing first and second desired, incremental penny offset prices in the offset price setting field;

adding the first desired offset price to the base price for the first customer operation to establish a first vending machine operation price for the first customer operation; and adding the second desired offset price to the base price for the second customer operation to establish a second vending machine operation price for the second customer operation.

18. The method according to claim 17, further comprising: storing both of the first and second desired offset prices in a single byte of storage space, with the first offset price being stored in one four bit zone and the second offset price being stored in another four bit zone.

* * * * *